United States Patent [19]

Seidel

[11] 3,763,437

[45] Oct. 2, 1973

[54] FREQUENCY-SHAPED AMPLIFIER WITH PEDESTAL AMPLIFYING STAGE

[75] Inventor: Harold Seidel, Warren, N.J.

[73] Assignee: Bell Telephone Laboratories, Incorporated, Murray Hill, N.J.

[22] Filed: Mar. 15, 1972

[21] Appl. No.: 234,782

[52] U.S. Cl. .................................. 330/53, 330/165
[51] Int. Cl. .............................................. H03f 3/60
[58] Field of Search .............................. 330/165, 53

[56] References Cited

UNITED STATES PATENTS 3,667,065 5/1972 Beurrier et al. ................ 330/124 R

*Primary Examiner*—Nathan Kaufman
*Attorney*—W. L. Keefauver et al.

[57] ABSTRACT

It often occurs that the gain characteristic of an amplifier that is frequency-shaped to correspond to some particular equalization function, differs materially, at the lower frequencies, from the loss characteristic sought to be equalized. The task of matching these two characteristics over a band of interest is shown to be eased by cascading a pedestal amplifying stage and a frequency-shaped amplifying stage and partitioning the overall amplifier gain between the pedestal amplifying stage and the frequency-shaped amplifying stage.

7 Claims, 12 Drawing Figures

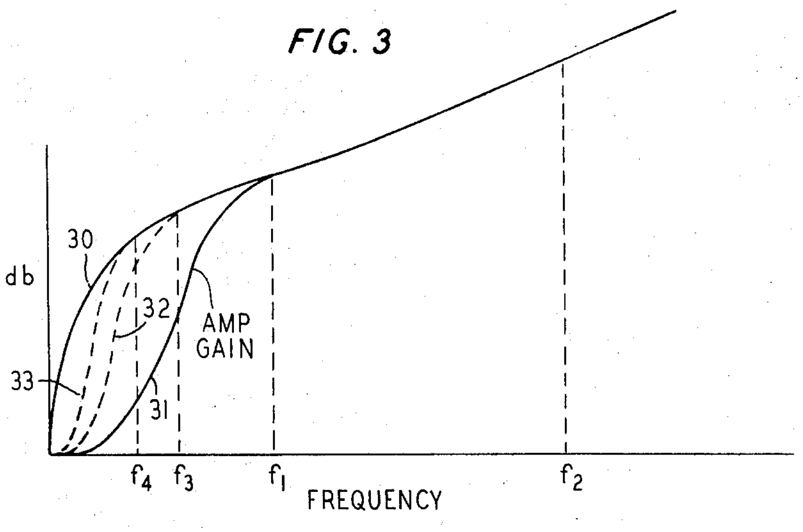
FIG. 4
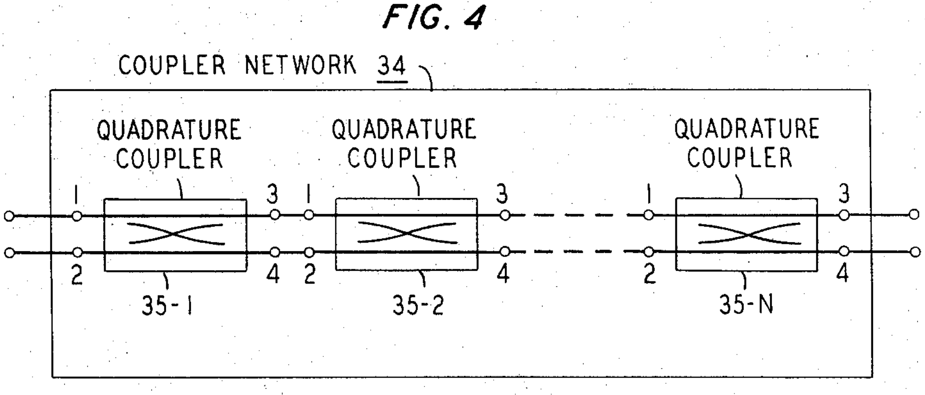
FIG. 5
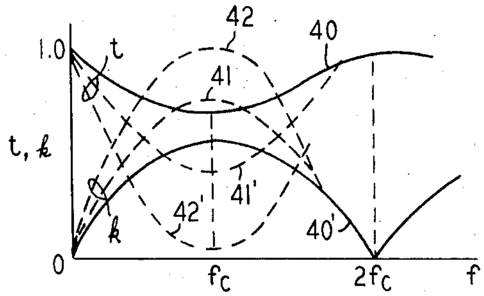

FREQUENCY-SHAPED AMPLIFIER WITH PEDESTAL AMPLIFYING STAGE

This application relates to frequency-shaped amplifiers.

BACKGROUND OF THE INVENTION

In the copending application Ser. No. 069,757, filed Sept. 4, 1970 and assigned to applicant's assignee, there is described a feed-forward amplifier having a frequency-dependent gain characteristic. As explained therein, a feed-forward amplifier recognizes the passage of time. Error is determined in relationship to a time-shifted reference signal, and is corrected in a time sequence that is compatible with the main signal. Accordingly, a feed-forward amplifier comprises two parallel wavepaths. One path, called the main signal path, includes the main amplifier comprising one or more cascaded signal amplifiers, and operates upon the signal to be amplified in the usual manner. A second path, called the error signal path, and which includes an error amplifier, accumulates a replica of the errors introduced into the signal by the main signal amplifier. These error components, including both noise and intermodulation distortion, are accumulated at a level and in proper time and phase relationship so that they can be injected into the main signal path in a manner to cancel the error components in the main signal path.

As was also explained in the above-identified application, the main amplifier and the error amplifier preferably have essentially flat, or frequency-independent gain characteristics over the frequency band of interest. Band-shaping is obtained primarily by shaping the power transfer characteristics of: the input power divider, which extracts a reference signal component from the input signal; the sampling coupler, which compares the output from the main amplifier with the reference signal component to form a difference or error signal; and the error injection coupler, which injects the error signal into the main signal path.

Typically, amplifiers of this type are used to compensate for the losses incurred along a transmission line. That is, the amplifier gain characteristic is designed to have the same shape as the transmission line loss characteristic. While this does not present a particular problem at the higher frequencies, considerable practical difficulties have arisen in the design of broadband amplifiers which extend significantly into the lower frequencies. A particularly difficult band to accommodate is one that ranges from 20 MHz and below, to 100 MHz and above. Briefly, the difficulty resides in the fact that the loss characteristic of a transmission line, expressed in decibels as a function of frequency, has an infinite slope at the origin, whereas the couplers used for frequency shaping produce an amplifier gain characteristic which has a zero slope at the origin. As a consequence, the coupler networks, each of which comprises a cascade of two or more directional couplers, must provide a low frequency region of excessive curvature in the gain characteristics in order to match the amplifier gain characteristic to the line loss characteristic. In the case of the feed-forward amplifier this is reflected in the practical unrealizability of the parameters for some of the directional couplers. Specifically, the degree of coupling required within the band of interest becomes too large to be practical.

More generally, a similar difficulty arises in the design of any amplifier whose frequency shaping network has a characteristic curve which differed materially at the lower frequencies from the loss characteristic to be equalized. Specifically, the difficulty resides in the realization of inductors of adequate size that retain their nominal values over the band. At the low edge of the band referred to hereinabove, some form of ferrimagnetic material must be used to realize the large inductor values necessary to synthesize the required reactances. While these materials provide the necessary permeability at the lower frequencies, they become very lossy at the higher frequencies. Indeed, the higher the permeability, the lower the frequency at which the losses become significant.

An alternative is to use larger coils and air cores. The difficulty with this arrangement is that the larger coils become a significant fraction of a wavelength at the higher frequencies, causing intractable frequency dispersion at the upper end of the band.

It is, accordingly, the broad object of the present invention to avoid the necessity of large low frequency curvature in the gain characteristic of frequency-shaped amplifiers.

SUMMARY OF THE INVENTION

In accordance with the present invention, the overall gain required of a frequency-shape amplifier is divided between a frequency-shaped amplifier stage, and a series-connected pedestal amplifier. In particular, the total gain is partitioned btween the two stages such that the requirements imposed upon the frequency shaping network are maintained within specified limits. In the particular case of a feed-forward amplifier, these limits are expressed in terms of the parameters of the frequency-shaping coupler networks.

It is an advantage of the invention that the addition of the most simple constant gain pedestal amplifier greatly simplifies the construction of a frequency-shaped amplifier.

These and other objects and advantages, the nature of the present invention, and its various features, will appear more fully upon consideration of the various illustrative embodiments now to be described in detail in connection with the accompanying drawings.

BRIEF DESCRIPTION OF THE DRAWING

FIG. 3 shows the loss characteristic of a typical transmission line, and the gain characteristic of a typical feed-forward amplifier;

FIG. 4 shows a coupler network comprising a cascade of quadrature couplers;

FIG. 5 shows the manner in which the coupler coefficients $t$ and $k$ vary as a function of frequency for a distributed parameter quadrature coupler;

DETAILED DESCRIPTION

Figure 1:
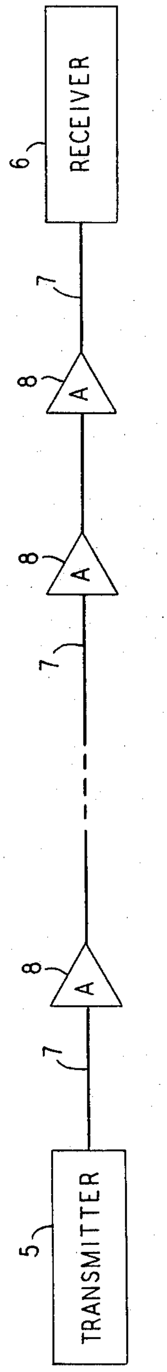
FIG. 1 shows, in block diagram, a communication system including amplifiers regularly spaced along a transmission line.

Referring to the drawings, FIG. 1 shows in block diagram a typical communication system comprising a transmitter 5 and a receiver 6 connected by means of a transmission line 7. Because of the losses associated with transmission line 7, amplifiers 8 are included at regularly spaced intervals therealong.

The requirements placed upon the amplifiers will, of course, vary from system to system. One general requirement, however, is that they amplify the transmitted signals in a manner to compensate for the losses incurred along the transmission line. Since these losses are, typically, not uniform across the frequency band, the gain characteristic of each amplifier (as a function of frequency) must be shaped so as to compensate for the particular loss characteristic of the transmission line. In general, the transmission loss, expressed in decibels, varies as the square root of the frequency. Accordingly, the gain of the amplifiers must increase as a function of frequency.

Finally, the amplifiers are, advantageously, designed to be as free of distortion as is economically possible. For example, intermodulation distortion in a carrier communication system substantially limits the capacity of the system. Accordingly, any significant reduction in intermodulation distortion advantageously results in a corresponding increase in system capacity and economy.

Figure 2:
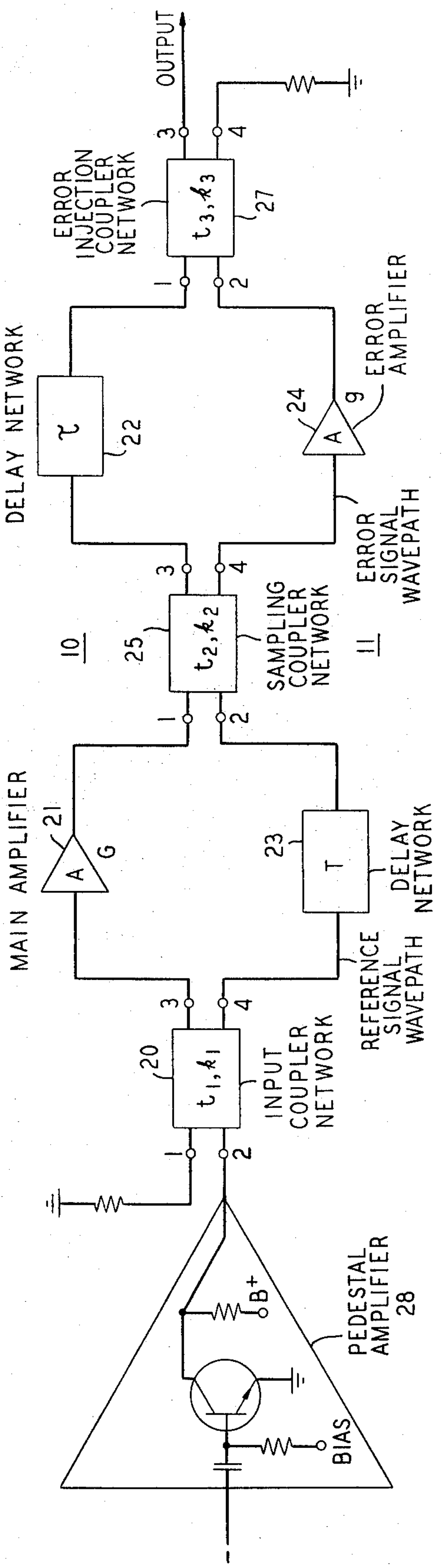
FIG. 2 shows an amplifier, in accordance with the present invention, including a constant gain pedestal amplifier stage and a frequency-shaped, feed-forward amplifier stage.

As explained in the above-identified application, the desired amplifier characteristics can be obtained by means of a feed-forward, error-correcting technique wherein the shaped gain characteristic of the feed-forward amplifier is realized by using active stages having essentially flat gain characteristics, and tailoring the power transfer characteristics of the coupler networks. This would not present a problem if the loss characteristic of the transmission line, and the power transfer characteristic of the coupler networks were similar. As a practical matter they are not. Indeed, they are generally so different that to conform the coupler network characteristic to the line loss characteristic results in a synthesis that is often unrealizable in practice. This situation is corrected, in accordance with the present invention, by the addition to each stage of amplification of a pedestal amplifier. For purposes of illustration, the latter shall be considered to have a flat gain characteristic over the band of interest. Accordingly, each of the amplifiers 8 in FIG. 1 includes two separate amplifying stages. One stage, as illustrated in FIG. 2, is a constant gain pedestal amplifier 28 which, advantageously, is a small, low power preamplifier. The other stage is a frequency-shaped power amplifier. For purposes of illustration, the latter is a feed-forward amplifier comprising a pair of parallel wavepaths 10 and 11. Wavepath 10 includes a main amplifier 21 and a first delay network 22. Wavepath 11 includes a second delay network 23 and an error amplifier 24. The gain G of the main amplifier, and the gain $g$ of the error amplifier are preferably constant over the frequency band of interest, while the power transfer properties of the input coupler network 20, the sampling coupler network 25, and the error injection coupler network 27 are shaped in the manner described in the above-identified copending application.

As indicated hereinabove, each of the amplifiers 8 is designed to compensate for the signal loss incurred along wavepath 7. Typically, this loss, expressed in decibels, varies as the square root of the frequency, as illustrated by curve 30 in FIG. 3. As will be noted, the slope of the loss curve at the origin is infinite. By contrast, the gain characteristic of the feed-forward amplifier, determined by the coupler networks, has a zero slope at the origin, as illustrated by curve 31. In order for the gain curve to match the loss curve, over the frequency band of interest $f_1$ to $f_2$, the former is designed to merge with the latter. As illustrated in FIG. 3, this merger for curves 30 and 31 occurs at the lower frequency $f_1$. If this merger is required to occur at a lower frequency, such as $f_3$, the gain curve must have a more severe curvature so as to rise more rapidly, as illustrated by the dashed curve 32. Similarly, as the frequency lowers further, the severity of the gain curve curvature increases, as illustrated by the second dashed curve 33. Each increase in curvature represents an added burden upon the frequency-shaping network parameters, as will now be considered in greater detail.

Coupler Networks

One form of coupler network of interest to the practice of the present invention comprises a cascade of quadrature hybrid couplers. While it will be recognized that other types of coupler networks can be used in connection with feed-forward amplifiers, the limitations met in the synthesis of quadrature couplers are representative of the design problems encountered in all such networks and, hence, their consideration in no way limits the precepts of the invention.

A typical coupler network 34, illustrated in block diagram in FIG. 4, comprises a plurality of N tandem-connected quadrature couplers 35-1, 35-2 ... 35-N. Each of the N couplers has four ports 1, 2, 3 and 4, arranged in pairs 1-2 and 3-4, with the ports comprising each pair being conjugate to each other and in coupling relationship with the ports comprising the pair of other ports. In particular, the coupling between the coupled ports is given by the coefficient of transmission $t_i$ and the coefficient of coupling $k_i$, where $t_i$ is proportional to the transmission between ports 1-3 and 2-4 of the $i^{th}$ coupler, and $k_i$ is proportional to the coupling between ports 1-4 and 2-3 for the $i^{th}$ coupler where $$|t_i^2| + |k_i^2| = 1 \qquad (1)$$

In addition, in a quadrature coupler, the coefficients bear a 90° phase relationship with respect to each other.

The manner in which the coefficients vary as a function of frequency depends upon the nature of the coupler. To illustrate, FIG. 5 shows the manner in which $t$ and $k$ vary for the so-called distributed parameter coupler of the type comprising a pair of coupled waveguides. (See, for example, U.S. Pat. No. 2,775,740). Typically, the $t$ parameter, which is unity at zero frequency, decreases to a minimum at a frequency $f_c$ for which the electrical length of the coupler corresponds to a quarter of a wavelength, and then increases again, reaching unity at the frequency $2f_c$ for which the coupler length is half a wavelength. Beyond that frequency, assuming no secondary effects, the variation repeats itself. Conversely, the $k$ parameter is zero at zero frequency, increases to a maximum at frequency $f_c$, and then decreases again to zero at $2f_c$. These variations are shown by the solid line curves 40 and 40'.

The minimum value assumed by $t$, and the corresponding maximum value of $k$ are a function of the coupling coefficient $c$ per unit length of coupler. The larger the coupling, the greater the change. Thus, the variations in $t$ and $k$, of a second coupler, with larger coupling, would be as given by the broken line curves 41 and 41'. For extremely large coupling, the parameter $t$ will approach zero at frequency $f_c$, while the parameter $k$ approaches unity, as illustrated by curves 42 and 42'. A so-called 3 db coupler is one for which the coupling is such that $|t| = |k|$ at the quarter wave frequency $f_c$.

Figure 6:
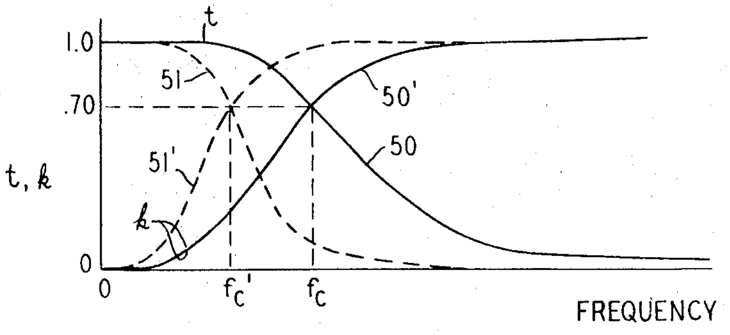
FIG. 6 shows the manner in which the coupler coefficients $t$ and $k$ vary as a function of frequency for a lumped parameter quadrature coupler.

FIG. 6, now to be considered, shows the manner in which the coupler coefficients vary with respect to frequency for the so-called lumped parameter couplers of the type described, for example, in U.S. Pat. No. 3,506,932. As before, the $t$ parameter is unity at zero frequency. However, for this coupler $t$ decreases continuously with increasing frequency, approaching zero asymtotically. Conversely, the $k$ parameter is zero at zero frequency, and increases with increasing frequency, approaching unity asymtotically. The frequency for which $|t| = |k|$ is defined as the crossover frequency. For the solid line curves 50 and 50', the crossover frequency occurs at $f_c$.

Here again, the degree of coupling influences the manner in which the parameters vary as a function of frequency. As the coupling increases, the crossover frequency decreases. Thus, the broken line curves 51 and 51' represent a coupler of higher coupling and a lower crossover frequency $f'_c$.

The synthesis of a coupler network, such as coupler network 34, having some arbitrary power division characteristic over some specified frequency band of interest, is described in U.S. Pat. No. 3,514,722. Using lumped parameter couplers, one obtains a solution which gives the crossover frequency for each of the couplers in the cascade. If we define the lower and upper frequencies of the amplifier to be $f_l$ and $f_h$, we will typically find that some of the crossover frequencies fall within this band whereas others fall well outside the band. Indeed some may fall so far outside the band that they can be replaced by simple connections since, for such couplers, either $t$ or $k$ is unity. To this end, we define an extended band of interest which lies between $0.1f_l$ and $10f_h$, and neglect any coupler whose crossover frequency lies outside this extended band.

The crossover frequencies of the remaining couplers are distributed across the band of interest and, in theory, any prescribed power division characteristic can be thus synthesized. As a practical matter, however, it is particularly difficult to construct a tightly coupled lumped element coupler which will retain the characteristic shown in FIG. 6 over a very broad band. Typically, secondary effects due to spurious reactances and core losses become significant at the higher frequencies. Thus, for a broadband amplifier, practical difficulties are encountered if a change in the coefficient of transmission $t$ of greater than 30 decibels is required over the band of interest. Stated another way, it is impractical to construct a coupler if the crossover frequency is too low. Unfortunately, this is precisely what occurs when the low frequency curvature demanded of the amplifier gain curve becomes too severe.

Figure 7:
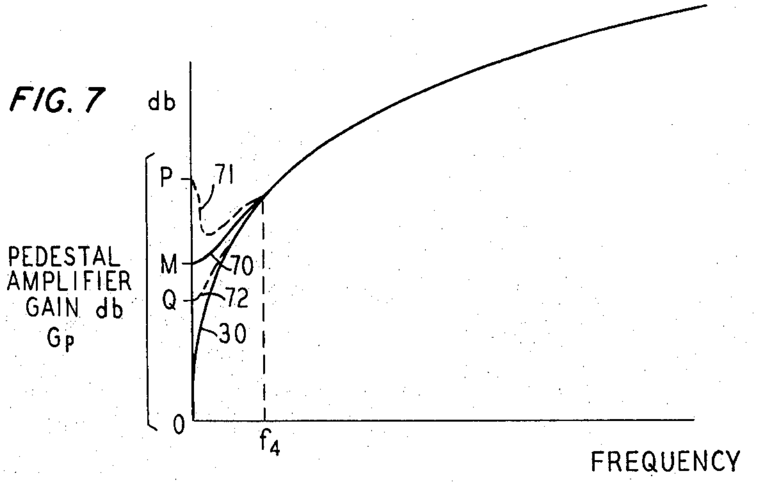
FIG. 7 shows the loss characteristic of a typical transmission line and the gain characteristic of a compensating amplifier comprising a frequency-shaped, feed-forward amplifier stage and a constant gain pedestal amplifier.

To avoid the above-described difficulties, a fixed amount of gain, $G_p$ is introduced in series with the transmission line 7 and the feed-forward amplifier 10. This pedestal has the effect of shifting the origin of the line loss characteristic relative to the origin of the amplifier gain characteristic, as illustrated in FIG. 7. As shown, the line loss curve 30 is drawn with respect to an origin "O". Assuming a pedestal amplifier gain of M decibels, the feed-forward amplifier is now only required to make up the difference between the loss curve and the fixed gain provided by the pedestal amplifier. This is readily done by means of a gain curve characteristic 70 which starts at a displaced origin "M" and merges with the loss curve at frequency $f_4$. As is evident, the curvature of this gain curve is much less severe than that of gain curve 33 in FIG. 3, which starts at the same origin as the loss curve and merges with it at the same frequency $f_4$.

As is equally evident from FIG. 7, the feed-forward amplifier gain curve varies as a function of the pedestal amplifier gain. If, for example, a constant gain of P decibels is introduced, the resulting feed-forward amplifier gain curve 71 must first decrease and then increase in order to merge at frequency $f_4$ with the proper slope. This obviously is no better, if not worse than any of the situations illustrated in FIG. 3. However, it is not apparent whether a pedestal of Q db, for example, resulting in a gain characteristic given by curve 72, constitutes a better or a worse condition than that produced by a pedestal of M db. Thus, the optimum manner in which the gain is partitioned must be determined for each case. This is done on a trial and error basis, as will now be explained.

Design of Pedestal Amplifier

As explained in my above-identified application, the coupler coefficients for each of the coupler network 20, 25 and 27 are defined as a function of the main amplifier gain G, the error amplifier gain $g$, and the desired overall frequency-gain characteristic $F(\omega)$. For input coupler network 20 of amplifier 10, these are given by $$|t_1^2| = \frac{G^2 + \sqrt{G^4 + 4(1-G^2)F(\omega)}}{2(G^2-1)}, \tag{2}$$

and $$|k_1^2| = 1 - |t_1^2| \tag{3}$$

where $G = g$.

In the instant case, however, the overall characteristic is modified by the presence of the pedestal amplifier. Specifically, for a feed-forward amplifier designed in accordance with the present invention, $t_1$ is given by $$|t_1^2| = \frac{(G')^2 + \sqrt{(G')^4 + 4(1-G')^2[F(\omega)/G_p]}}{2[(G')^2-1]} \tag{4}$$

where G' is a reduced gain, approximately equal to $G/G_p$.

As will be noted from equation (3), the gain function $F(\omega)$ is now divided by the constant gain, $G_p$, of pedestal amplifier 28, and the main amplifier gain $G$ is reduced an appropriate amount.

The modified parameter $k_1$ is as given by equation (3), using the $t_1$ of equation (4).

Figure 8:
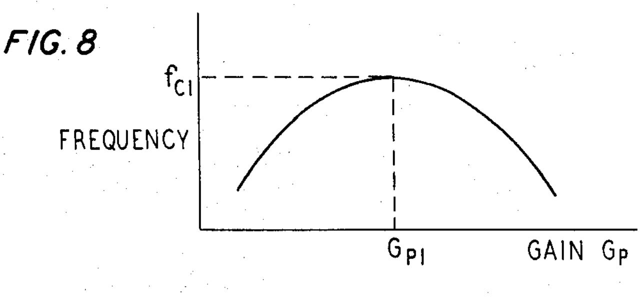
FIGS. 8 and 9 show the manner in which the cross-over frequency of the lowest crossover frequency lumped parameter coupler varies as a function of the pedestal amplifier gain.

Having defined $t$ and $k$, for each of the coupler networks, they can then be synthesized, as indicated hereinabove, in the manner outlined in U. S. Pat. No. 3,514,722. Specifically, this patent discloses a class of coupler networks comprising a cascade of two or more quadrature couplers of the type illustrated in FIG. 4. As explained therein, with $t$ and $k$ specified for each network, the ratio of $|t|$ to $|k|$ is formed and equated to either equation (42) or (43) of the above-identified patent, depending upon whether there are an even or an odd number of G sections in the network. Solving these equations in the manner to be described in greater detail hereinbelow, one obtains the crossover frequency for each of the couplers in the cascade. Some of these frequencies will fall well outside the band of interest, and can be omitted. Within the band of the couplers will have the lowest crossover frequency for a particular value of $G_p$. For a different value of $G_p$, the crossover frequency for this one coupler will change. If solutions are obtained over a range of values of $F_p$, a curve can be drawn showing the variation in the crossover frequency, $f_c$, of the lowest frequency coupler, as a function of $G_p$. Such a curve is shown in FIG. 8. As will be noted, the curve reaches a maximum $f_{c1}$ for a specific value of gain $G_{p1}$. This then defines the preferred gain of the pedestal amplifier in that it maximizes the frequency of the lowest frequency coupler. Actually, since the curve is relatively broad, a gain value within the range $G_{p1} \pm 10$ percent would not significantly lower $f_{c1}$ and, hence, any pedestal amplifier gain within these limits would also be acceptable.

Figure 9:
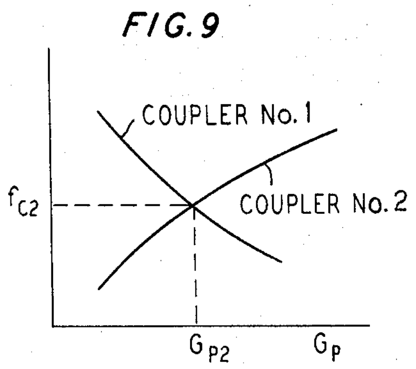

There is a second possibility, illustrated in FIG. 9, wherein the crossover frequency of one of the couplers will be increasing as a function of the pedestal amplifier gain, whereas the crossover frequency of another coupler in the cascade will be decreasing. If this occurs, the curves for coupler No. 1 and coupler No. 2 will cross at some particular gain $G_{p2}$. The intersection will then define the preferred gain for the pedestal amplifier.

Having defined the power division characteristic of the input coupler network 20, the power division characteristics of the sampling coupler network 25, and the error injection coupler network 27 are similarly calculated and synthesized.

A similar technique is employed using distributed parameter directional couplers. In this latter case, all of the couplers comprising the respective coupler networks will have the same quarter wavelength frequency $f_c$. However, the coupling coefficient $c$ per unit length will vary. As before, severe curvature in the power division characteristic of the input coupler will be reflected in too high a coupling coefficient for one or more of the individual couplers. That is, at least one of the couplers will have $t$ and $k$ characteristics as illustrated by curves 42—42' in FIG. 5, and will be impractical to construct. Typically, any coupler that requires a change in the $t$ (or $k$) coefficient greater than 15 decibels across the band of interest is considered excessive. To minimize this change, the pedestal amplifier gain is varied, as described above, and the maximum coupling computed. The optimum gain is that which yields the lowest maximum coupling.

EXAMPLE

To illustrate in greater detail the manner in which the pedestal amplifier gain is determined, and the manner in which the couplers networks of a feed-forward amplifier are designed, a specific example, using lumped element quadratures couplers, is included hereinbelow. Before doing so, however, the steps in the calculation process will be discussed qualitatively.

Steps

1. Identify the loss characteristic to be equalized.

This, typically, is the starting point of the solution. For convenience, the loss, in decibels, is plotted as a function of frequency on log-log graph paper.

2. Select an arbitrary number of points ($f_i$, $F(\omega)_i$) distributed along the loss curve within the band of interest to which the amplifier gain characteristic is to be matched.

It is apparent that the greater the number of points selected, the more accurate will be the match. However, the greater the number of points, the greater the number of couplers required to synthesize each of the coupler networks. Accordingly, a compromise, based upon practical considerations of cost and accuracy, must be made.

3. Since the amplifier gain must equal the cable loss at each frequency across the band of interest, the loss curve $F(\omega)_i$ is also the amplifier gain curve. Accordingly, select a main amplifier gain sufficient to provide the necessary gain, select an error amplifier gain, and select a pedestal amplifier gain, and then calculate the $t$ and $k$ coefficients at each of the selected frequencies for each of the coupler networks. Assuming, for purposes of illustration, that the main amplifier gain is equal to the error amplifier gain, the coefficients are given by:

For input coupler network 20:

$$|t_1^2|\,i = \frac{(G')^2 + \sqrt{(G')^4 + 4\,[1-(G')]^2 \left[\frac{F(\omega)_i}{G_p}\right]}}{2[(G')^2-1]} \tag{5}$$

and $$|k_1^2|_i = 1 - |t_1^2|_i \tag{6}$$

For sampling coupler network 25:

$$|k_2^2|_i = |t_1^2|_i/(F(\omega)_i/G_p) \tag{7}$$

and $$|t_2^2|_i = 1 - |k_2^2|_i \tag{8}$$

where $G_p$ is the pedestal amplifier gain;

and $G'$ is the main amplifier gain.

It should be noted that the main amplifier gain is not unique, and can be adjusted during the design procedure. The only requirement is that it be sufficiently large to provide the required amplifier gain over the band of interest. 4. Form the ratio $t_i/k_i\,(\omega)$ for each coupler network at each frequency and solve the following polynomial for the parameters $a_1, a_2 \ldots a_n$:

$$\frac{t_i}{k_i}(\omega)=\frac{1+a_2(\omega)^2+a_4(\omega)^4 \; . \; . \; . \; a_n(\omega)^n}{a_1(\omega)+a_3(\omega)^3 \; . \; . \; . \; a_{n-1}(\omega)^{n-1}} \qquad (9)$$

where $n$ is the number of matching points selected. 5. Having determined the coefficients $a_1, a_2 \ldots a_n$, solve for the roots of the following equation:

$$a_n(\omega)^n + a_{n-1}(\omega)^{n}{}_{+}{}^{1} \;\ldots\; a_2(\omega)^2 + a_1(\omega) + 1 = 0 \qquad (10)$$

The roots obtained will include both real roots and pairs of conjugate complex roots. Each of the real roots is numerically equal to the crossover frequency of one of the couplers in the network. These couplers are connected in tandem. The complex roots define pairs of couplers whose crossover frequencies $f_a$ and $f_b$ are given in terms of the complex roots $p_a$ and $p_b$ by $$f_a = -\,\Omega/\pi \cos\theta \qquad (11)$$

and $$f_b = -\,\Omega^2/4\pi^2 f_a \qquad (12)$$

where $$p_{a,b} = \Omega\epsilon^{\pm i\theta} \qquad (13)$$

Complex conjugate roots are represented by pairs of couplers connected as two-element cascades, as will be illustrated hereinbelow.

It will also be noted that some of the roots have positive real parts while the others have negative real parts. The signs signify the groupings of the couplers on either side of a 180° phase shifter.

6. Having determined the crossover frequencies for the couplers in each of the coupler networks, the crossover frequency of the lowest frequency coupler is plotted as a function of the pedestal amplifier gain.

7. Repeat steps 1 through 6, and then select that design for which the pedestal amplifier gain optimizes the coupler networks.

The following specific example will illustrate the above-described design procedure.

1. The specific illustrative problem is to design an amplifier which will compensate one-half mile of coaxial cable over a band of frequencies between 14 MHz and 141 MHz. The particular cable is that used in the Bell System L-4 transmission system, as described in the April 1969 issue of the Bell System Technical Journal at pages 1,070 et seq.

Figure 10:
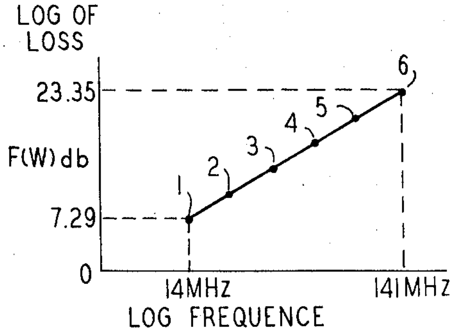
FIG. 10 shows the loss characteristic of a particular transmission line.

2. FIG. 10 shows a plot of the cable loss over the band of interest when plotted on a log-log scale. For purposes of illustration, six points, uniformly distributed along the curve were selected. For each point we obtain a frequency $f_i$, and a loss $F(\omega)_i$. These are tabulated in Table I.

TABLE I

| Point | Frequency in MHz $f_i$ | Loss in db $F(\omega)_i$ |
|---|---|---|
| 1 | 14.00 | 7.29 |
| 2 | 22.20 | 9.19 |
| 3 | 35.20 | 11.59 |
| 4 | 55.90 | 14.63 |
| 5 | 88.80 | 18.49 |
| 6 | 140.90 | 23.35 |

3. Assuming, for the first calculation, $$G_p = 0 \text{ db}$$

and $G_1 = 31$ db $t_1$ for coupler network 20, and $t_2$ for coupler network 25 are calculated to be:

TABLE II

| Frequency MHz | $t_1$ | $t_2$ |
|---|---|---|
| | (In db down from zero at zero frequency) | |
| 14.00 | 0.0147 | 7.2245 |
| 22.20 | 0.0246 | 9.1173 |
| 35.20 | 0.0453 | 11.5231 |
| 55.90 | 0.0955 | 14.6220 |
| 88.80 | 0.2464 | 24.9462 |
| 140.90 | 0.9597 | 24.9462 |

$k_1$ and $k_2$, not given, are obtained directly by means of equations (6) and (7).

4. Form the ratio $t_i/k_i\,(\omega)$ at each frequency for each coupler network, and evaluate the coefficients $a_1, a_2 \ldots a_6$ of equation (9).

5. Form equation (10), and solve for its roots. For this specific example, the following roots were obtained:

For input coupler network 20:

TABLE III

| Coupler | Roots in MHz Real part | Imaginary part | Crossover frequency to four significant figures, in MHz. |
|---|---|---|---|
| 1 | −41.170156, | 0 | 41.17 |
| 2 | 42.214947, | 0 | 42.21 |
| 3 | −10.241931, | 0 | 10.24 |
| 4 | 10.680267, | 0 | 10.68 |
| 5 | −58.751893, | −224.80701 | 117.5 |
| 6 | −58.751893, | 224.80701 | 459.5 |

For sampling coupler network 25:

TABLE IV

| Coupler | Roots in MHz Real part | Imaginary part | Crossover frequency to four significant figures, in MHz. |
|---|---|---|---|
| 1 | −3.8084381, | 0 | 3.808 |
| 2 | 46.466061, | 0 | 46.47 |
| 3 | −50.170535, | 0 | 50.17 |
| 4 | 14.144429, | 0 | 14.14 |
| 5 | −19.919485, | 0 | 19.92 |
| 6 | −4103.2803, | 0 | 4103.00 |

Upon examination of the couplers making up coupler network 20, we find that all of them have crossover frequencies which fall within the extended band of interest between 1.4 MHz and 1,410 MHz and, hence, none is omitted. However, the crossover frequencies of couplers 3 and 4, 10.24 MHz and 10.68 MHz, are marginally practical.

With respect to coupler network 25, it will be noted that coupler 6, at 4,103 MHz, is well beyond the upper frequency limit of 1,410 MHz and can be omitted. Coupler 1 of network 25, on the other hand, has a crossover frequency of 3.803 MHz, well within the band but so low as to be impractical to implement for use over the band. This is reflected in the large change of about 7.2 decibels in $t_2$ between zero frequency and 14 MHz.

In view of the above it is apparent that the attempt to derive all of the required gain directly from the feed-forward amplifier has failed, and that a pedestal amplifier with some finite gain is necessary. Accordingly, some arbitrary pedestal gain is assumed and steps 1 through 6 are repeated. For purposes of illustration, a $G_p$ of 4 decibels was selected, and the main amplifier gain $G'$ is reduced accordingly to 27 db. The resulting $t$ coefficients, roots and crossover frequencies for this second case are tabulated below.

TABLE V

| $f$ in MHz | $t_1$ in db | $t_2$ in db |
|---|---|---|
| 14.00 | 0.0095 | 3.2140 |
| 22.20 | 0.0194 | 5.1068 |
| 35.20 | 0.0400 | 7.5125 |
| 55.90 | 0.0901 | 10.6113 |
| 88.80 | 0.2409 | 14.7103 |
| 140.90 | 0.9528 | 20.9323 |

Input coupler network 20:

TABLE VI

| Coupler | Roots Real Part | Imaginary Part | Crossover Frequency MHz |
|---|---|---|---|
| 1 | −51.019262, | 0 | 51.02 |
| 2 | 51.911473, | 0 | 51.91 |
| 3 | −17.431704, | 0 | 17.43 |
| 4 | 17.86013, | 0 | 17.86 |
| 5 | −58.541568, | −224.64395 | 117.1 |
| 6 | −58.541568, | 224.64395 | 460.3 |

Sampling coupler network 25:

TABLE VII

| Coupler | Roots Real Part | Imaginary Part | Crossover Frequency |
|---|---|---|---|
| 1 | −9.8807545, | 0 | 9.880 |
| 2 | 54.575951, | 0 | 54.57 |
| 3 | −58.521121, | 0 | 58.52 |
| 4 | 20.027753, | 0 | 20.03 |
| 5 | −27.354374, | 0 | 27.35 |
| 6 | −2570,4439, | 0 | 2570. |

It will be noted that all of the couplers in network 20 are well within the extended band of interest and that the lowest crossover frequency is 17.43 MHz, as opposed to 10.28 MHz in Case I. For coupler network 25, coupler 6 is outside the upper limiting frequency and can be omitted. While the crossover of the lowest frequency coupler has increased from 3.808 MHz to 9.181 MHz, a considerable improvement, it is still considered to be too low. Accordingly, steps 1 to 6 are again repeated. For this third case the pedestal amplifier gain is increased to 4.6 decibels and the main amplifier gain correspondingly reduced to 26.4 decibels. The results of this change are given in TABLES VIII, IX and X.

TABLE VIII

| Frequency MHz | $t_1$ db | $t_2$ db |
|---|---|---|
| 14.00 | 0.0082 | 2.6114 |
| 22.20 | 0.0181 | 4.5042 |
| 35.20 | 0.0387 | 6.9099 |
| 55.90 | 0.0888 | 10.0087 |
| 88.80 | 0.2395 | 14.1076 |
| 140.90 | 0.9511 | 20.3289 |

Input coupler network 20:

TABLE IX

| Coupler | Roots Real Part | Imaginary Part | Crossover Frequency MHz |
|---|---|---|---|
| 1 | −27.525648 , | 0 | 27.53 |
| 2 | 28.398074 , | 0 | 28.40 |
| 3 | 0.001068 , | −52.970381 | 0.00214 |
| 4 | 0.001068 , | 52.970381 | 1313.× $10^3$ |
| 5 | −60.274231 , | −225,98723 | 120.5 |
| 6 | −60.274231 , | 225.98723 | 453.8 |

Sampling coupler network 25:

TABLE X

| Coupler | Roots Real Part | Imaginary Part | Crossover Frequency MHz |
|---|---|---|---|
| 1 | −13.187401 , | 0 | 13.19 |
| 2 | 31.949611 , | 0 | 31.95 |
| 3 | −40.964004 , | 0 | 40.96 |
| 4 | −2478.1452 , | | 2478. |
| 5 | 0.002502705, | −52.963302 | 0.005005 |
| 6 | 0.002502705, | 52.963302 | 5604.×$10^2$ |

The slight increase of only 0.6 decibel in the pedestal amplifier gain has produced a number of significant changes. With respect to coupler network 20, it has placed couplers 3 and 4 well outside the extended band of interest and, hence these couplers can be omitted. In addition it has raised the frequency of the lowest crossover frequency from 16.43 MHz to 27.53 MHz, a significant improvement.

With respect to coupler network 25, couplers 4, 5 and 6 can be omitted, as being outside the extended band of interest, and the lowest cutoff frequency has been raised from 9.881 MHz to 13.19 MHz.

It is apparent that the process can be repeated for other values of pedestal gain. However, the parameters for Case III are considered to be reasonable, and could readily be implemented. The resulting coupler networks would appear as shown in FIGS. 11 and 12.

Figure 11:
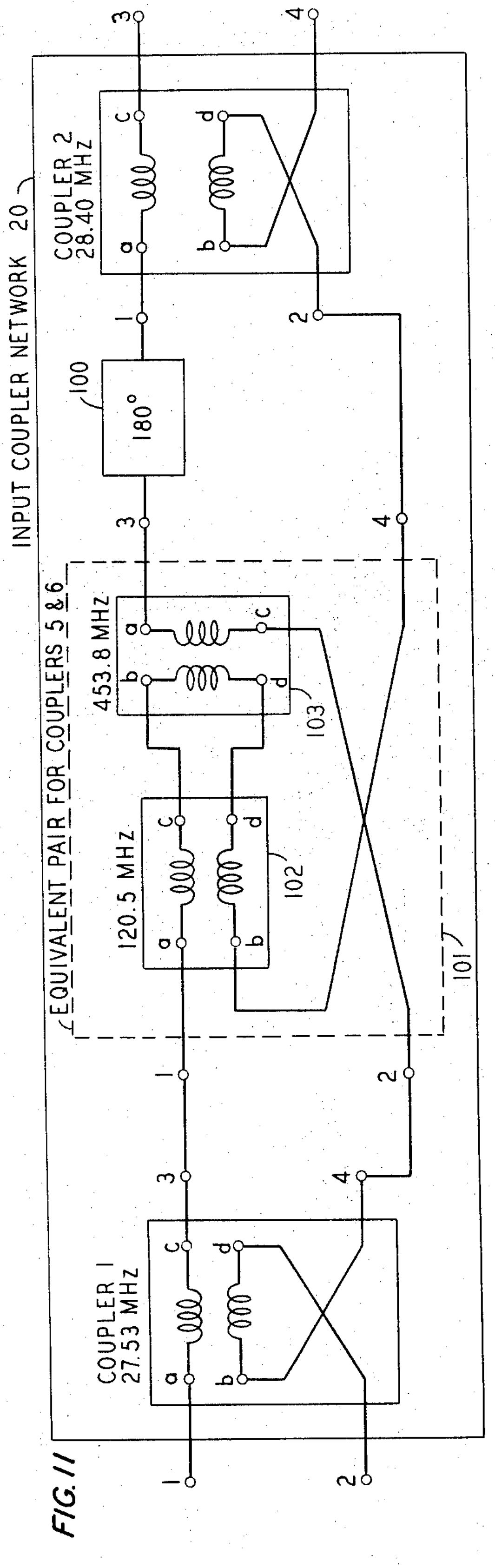
FIGS. 11 and 12 show two coupler networks designed in accordance with the teachings of the present invention.
Figure 12:
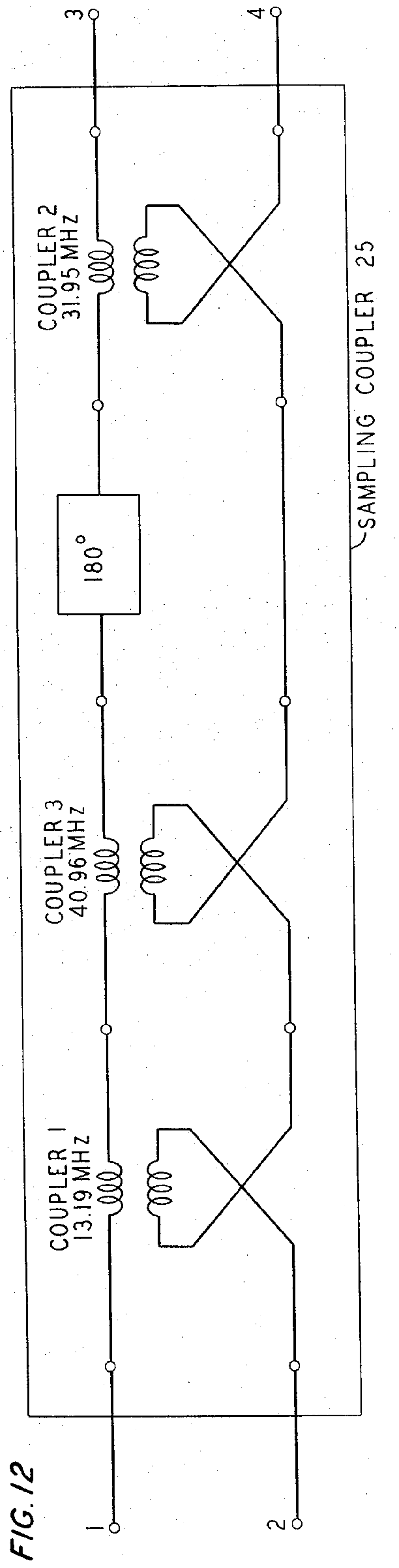

Input coupler network 20, shown in FIG. 11, comprises couplers 1, 2, 5 and 6, as tabulated in Table IX. As indicated hereinabove, the couplers are grouped in accordance with the sign of the real part of their respective roots. Thus, couplers 1, 5 and 6, all of whose roots have negative real parts, are grouped together on one side of a 180° phase shifter 100. Coupler 2, whose root has a positive real part, is on the other side of phase shifter 100.

Each coupler is a lumped element coupler, of the type described in U. S. Pat. No. 3,452,300, comprising a pair of coupled inductors. The inductor ends $a$, $b$, $c$ and $d$ comprise the four ports of the coupler, and are arranged in pairs $a$–$d$ and $b$–$c$, with the ports of each pair being isolated from each other and in coupling relationship with the ports of the other pair of ports. Specifically, the coupling between ports comprising the opposite ends of a winding (i.e., $a$–$c$, $b$–$d$) is given by the coefficient of transmission $t$. The coupling between ports comprising adjacent ends of different winding (i.e., $a$–$b$, $c$–$d$) is given by the coefficient of coupling $k$. Thus, a unit signal applied to port $a$ would produce a signal $t$ at port $c$ and a signal $k$ at port $b$. Since the couplers are to operate in the so-called "forward scattered mode," an internal cross connection is made involving ports $b$ and $d$ such that with respect to the external ports 1, 2, 3 and 4 of each coupler, the conjugate pairs are 1–2 and 3–4. Couplers of this type are referred to as operating in the forward scattered mode because the signal flow from ports 1 and 2 is to ports 3 and 4, which is in the general direction of signal flow.

Coupler 1, having a real root, is synthesized by a coupler having a crossover frequency of 27.53 MHz, equal to its root. Couplers 5 and 6, on the other hand, have conjugate complex roots. These are synthesized by means of a pair of couplers 102 and 103 interconnected such that one pair of adjacent inductor ends *c* and *d* of one of the couplers 102, is connected, respectively, to opposite ends *b* and *d* of one inductor of the other of the couplers 103. Port *b* of coupler 102 and port *c* of coupler 103 are cross-connected internally, to form an equivalent coupler 101 having external pairs of ports 1–2 and 3–4. The crossover frequencies for the two couplers 102 and 103 are 120.5 MHz and 453.8 MHz, respectively.

Coupler 2, having a real root, is synthesized by a single coupler having a crossover frequency 28.40 MHz, equal to its root. The two groups of couplers, including coupler 1, and the equivalent pair for couplers 5 and 6, having negative real roots, and coupler 2 having a positive real root, are separated by 180° phase shifter 100 disposed in the wavepath connecting port 3 of equivalent coupler 101 to port 1 of coupler 2. The resulting input coupler network 20 is itself a quadrature coupler whose transmission *t*, between port 1 of coupler 1 and port 3 of coupler 2, and between port 2 of coupler 1 and port 4 of coupler 2 is as given in Table VIII.

In a similar manner, the sampling coupler network 25 is synthesized from the data given in Table X to form the coupler network shown in FIG. 12.

While the emphasis has been directed primarily to maximizing the crossover frequency of the lowest frequency coupler, there are other factors which should be considered. For example, so long as all the crossover frequencies are high enough to be reasonable, the pedestal amplifier gain and the main amplifier gain can be varied for the purpose of reducing the number of couplers necessary to synthesize the coupler networks. This can be done in either of two ways. The first method is to select that gain for which the coupler crossover frequencies of some of the couplers fall outside the extended band of interest, as in Case III described above. The second method is to find a solution for which two couplers have equal crossover frequencies but real roots of opposite sign. As was disclosed in U. S. Pat. No. 3,184,691, two identical quadrature couplers separated by a 180° phase shifter form an all-pass network. As such, they contribute nothing to the band-shaping properties of the network and can be eliminated from the circuit.

Summary

The realization of a gain characteristic that differs significantly, at the lower frequencies, from some loss characteristic sought to be equalized, is materially simplified by partitioning the overall gain between a pedestal amplifier stage and a frequency-shaped amplifier stage. In a simple embodiment, the pedestal amplifier gain is constant over the band of interest, and all the frequency-shaping is produced by the frequency-shaped amplifier stage. However, some shaping can also be provided by the pedestal amplifier.

In the case where the frequency-shaped amplifier stage is a feed-forward amplifier using lumped element quadrature couplers for frequency-shaping, the gain is partitioned so as to maximize the crossover frequency of the coupler having the lowest crossover frequency. In the particular case of an amplifier designed to operate over the range of frequencies between about 20 MHz and about 200 MHz, the gain is partitioned such that the crossover frequency of the lowest frequency coupler is at least above 10 MHz or, in any case, no coupler has a change in *t* of more than 30 db over the band of interest.

In the case of an amplifier using distributed parameter couplers, the gain is partitioned such that the maximum change in the coupler coefficients over the band of interest is no greater than 15 db.

Where frequency-shaping is realized by means of circuit elements other than quadrature couplers, as, for example, two-ports comprising combinations of reactive circuit elements, the gain is partitioned to minimize the inductance of the largest inductor in the frequency-shaping network. One example of such a circuit, described in an article entitled "A Feedforward Experiment Applied to an L–4 Carrier System Amplifier" by H. Seidel, published in the June 1971 issue of the IEEE Transactions on Communication Technology, employs a pair of matched, dual reactive networks housed between a pair of 3 db magic-T hybrids.

While the present invention has been described in the context of equalizing the losses along a transmission line by means of a feed-forward amplifier, it will be recognized that the principles of the invention can be advantageously applied to any situation where the loss characteristic to be compensated differs significantly from the gain characteristic of the compensating amplifier. The case described herein, of a transmission line and a feed-forward amplifier using quadrature couplers for frequency shaping, is an extreme situation which clearly illustrates the advantages of the technique.

Thus, in all cases it is understood that the above described arrangement is illustrative of but one of the many possible specific embodiments which can represent applications of the principles of the invention. Numerous and varied other arrangements can readily be devised in accordance with these principles by those skilled in the art without departing from the spirit and scope of the invention.

I claim:

1. An amplifier for compensating, over a prescribed band of frequencies between a lower frequency $f_l$ and a higher frequency $f_h$, a loss characteristic wich varies as a function of frequency comprising:

a pair of amplifying stages connected in cascade;

one of said stages having a gain-frequency characteristic over said band of frequencies defined by means including a plurality of lumped-element quadrature couplers;

said gain characteristic being sufficiently different than said loss characteristic at frequencies below $f_l$ such that in the absence of additional amplification below frequency $f_l$ the coefficient of transmission of at least one of said couplers would change by more than 30 db over said band of frequencies;

the other of said amplifying stages having a gain-frequency characteristic for introducing sufficient gain within the frequency band below $f_l$ so as to limit the change in the coefficient of transmission of all of said couplers to less than 30 db over said band of frequencies between $f_l$ and $f_n$.

2. The amplifier according to claim 1 wherein said band of frequencies extends from below 20 megahertz to above 100 megahertz.

3. The amplifier according to claim 1 wherein the gain-frequency characteristic of said one amplifying stage is defined by means including one or more lumped-element quadrature couplers having crossover frequencies which fall within an extended band of frequencies between 0.1 $f_l$ and 10 $f_h$;

and wherein the gain of said other amplifying stage is such that the crossover frequency of the lowest frequency coupler is maximized.

4. The amplifier according to claim 1 wherein said other amplifying stage has a constant gain-frequency characteristic over said band of frequencies.

5. The amplifier according to claim 1 wherein said one amplifying stage is a feed-forward amplifier.

6. An amplifier for compensating, over a prescribed band of frequencies between a lower frequency $f_l$ and a higher frequency $f_h$, a loss characteristic which varies as a function of frequency comprising:

a pair of amplifying stages connected in cascade;

one of said stages having a gain-frequency characteristic over said band of frequencies defined by means including a plurality of distributed parameter quadrature couplers;

said gain characteristic being sufficiently different than said loss characteristic at frequencies below $f_l$ such that in the absence of additional amplification below frequency $f_l$ the coefficient of transmission of at least one of said couplers would change by more than 15 db over said band of frequencies;

the other of said amplifying stages having a gain-frequency characteristic for introducing sufficient gain within the frequency band below $f_l$ so as to limit the change in the coefficient of transmission of all of said couplers to less than 15 db over said band of frequencies between $f_l$ and $f_h$.

7. An amplifier for compensating, over a prescribed band of frequencies between a lower frequency $f_l$ and a higher frequency $f_h$, a loss characteristic which varies as a function of frequency comprising:

a pair of amplifying stages connected in cascade;

one of said stages having a gain-frequency characteristic over said band of frequencies defined by one or more inductive elements, and which is different than said loss characteristic below frequency $f_l$;

the other of said amplifying stages having a gain-frequency characteristic for introducing sufficient gain within the frequency band below $f_l$ so as to minimize the inductance of the largest of said inductive elements.

* * * * *